(12) United States Patent
Schnee

(10) Patent No.: US 7,811,074 B2
(45) Date of Patent: Oct. 12, 2010

(54) FOOD EXTRUDER

(76) Inventor: Christine Marie Schnee, 103 Weston Estates Dr., Easley, SC (US) 29642

( * ) Notice: Subject to any disclaimer, the term of this patent is extended or adjusted under 35 U.S.C. 154(b) by 0 days.

(21) Appl. No.: 12/154,597

(22) Filed: May 23, 2008

(65) Prior Publication Data
US 2009/0291158 A1   Nov. 26, 2009

(51) Int. Cl.
*A23P 1/12* (2006.01)
(52) U.S. Cl. ............ 425/183; 425/191; 425/376.1; 425/461
(58) Field of Classification Search .......... 425/183, 425/191, 376.1, 461
See application file for complete search history.

(56) References Cited

U.S. PATENT DOCUMENTS

| | | | | |
|---|---|---|---|---|
| 2,928,533 A | * | 3/1960 | Loucony | 206/375 |
| 3,997,084 A | | 12/1976 | Davis, Jr. | 222/326 |
| 4,258,866 A | | 3/1981 | Bergman | 222/333 |
| 5,002,737 A | * | 3/1991 | Tervamaki | 422/100 |
| 5,839,612 A | | 11/1998 | Burke | 222/333 |
| 5,993,188 A | | 11/1999 | Mak | 425/376.1 |
| 6,041,976 A | | 3/2000 | Robertson | 222/333 |
| 6,439,274 B1 | * | 8/2002 | DeBoisblanc | 141/67 |
| 7,413,429 B1 | * | 8/2008 | Mangelsen | 425/376.1 |

OTHER PUBLICATIONS

Unknown; Makin's Clay web site; Feb. 6, 2008; http://www.makinsclay.com/US/eng/press_release/press_201222006.htm; p. 1; Advertisement for "Makin's Professional Ultimate Clay Extruder".

\* cited by examiner

*Primary Examiner*—Yogendra N Gupta
*Assistant Examiner*—Joseph Leyson
(74) *Attorney, Agent, or Firm*—Thomas L. Moses; Monahan & Moses, LLC

(57) ABSTRACT

A food extruder including a barrel provided at one end with an outlet from which the food substance can be extruded, a rotatable screw positioned within the barrel that is capable of being rotated and moved longitudinally within the barrel, a handle member at a top end of the rotatable screw for manual engagement, and a rod member protruding from an upper portion of the handle member for insertion into a drill chuck. The rod member, in a preferred embodiment, has a hexagonal cross section, which facilitates insertion and securement within a drill chuck, so that the drill may be used to turn the rotatable screw, rather than having to turn it manually. Additionally, a hand grip member may be attached to the barrel member at a generally right angle thereto, so that a user may grip the hand grip while using the drill to turn the rotatable screw, in order to prevent the entire extruder from rotating.

10 Claims, 4 Drawing Sheets

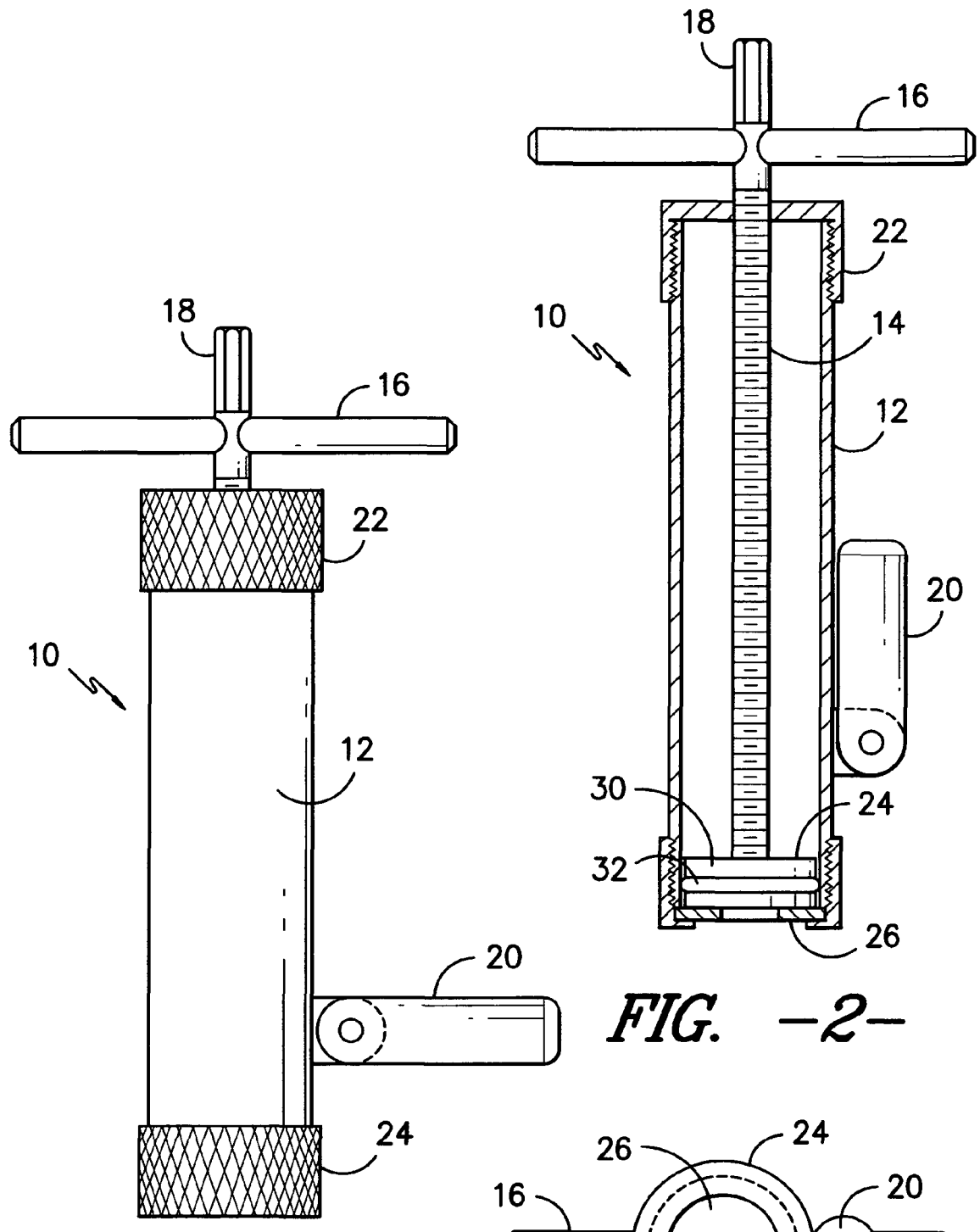
FIG. -2-
FIG. -1-
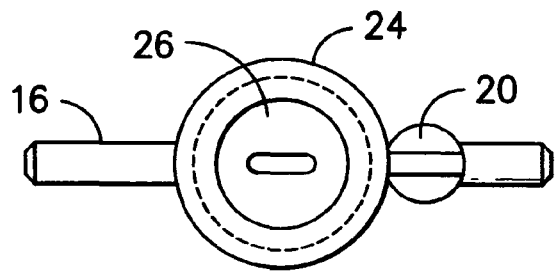
FIG. -3-

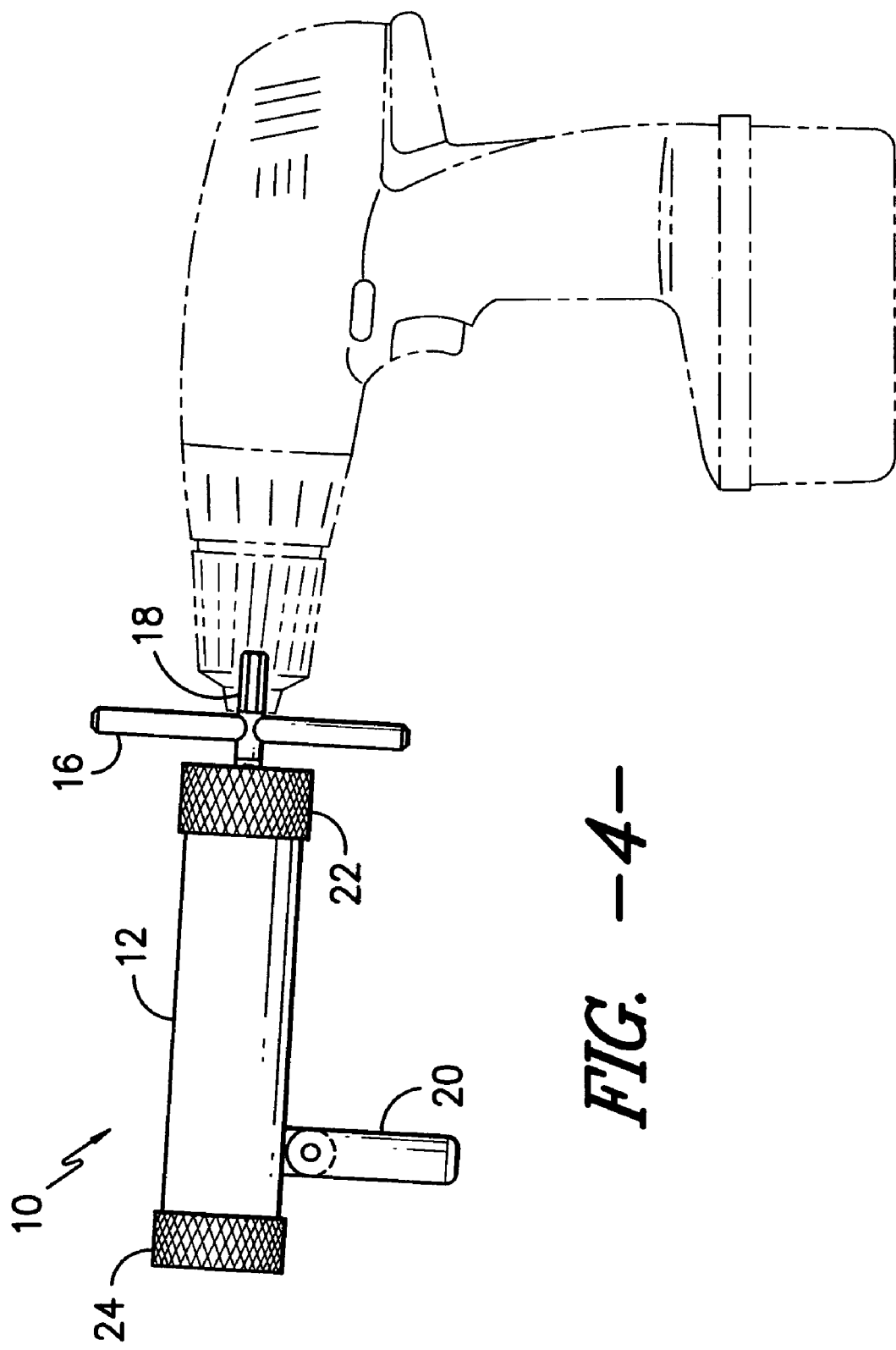
FIG. -4-

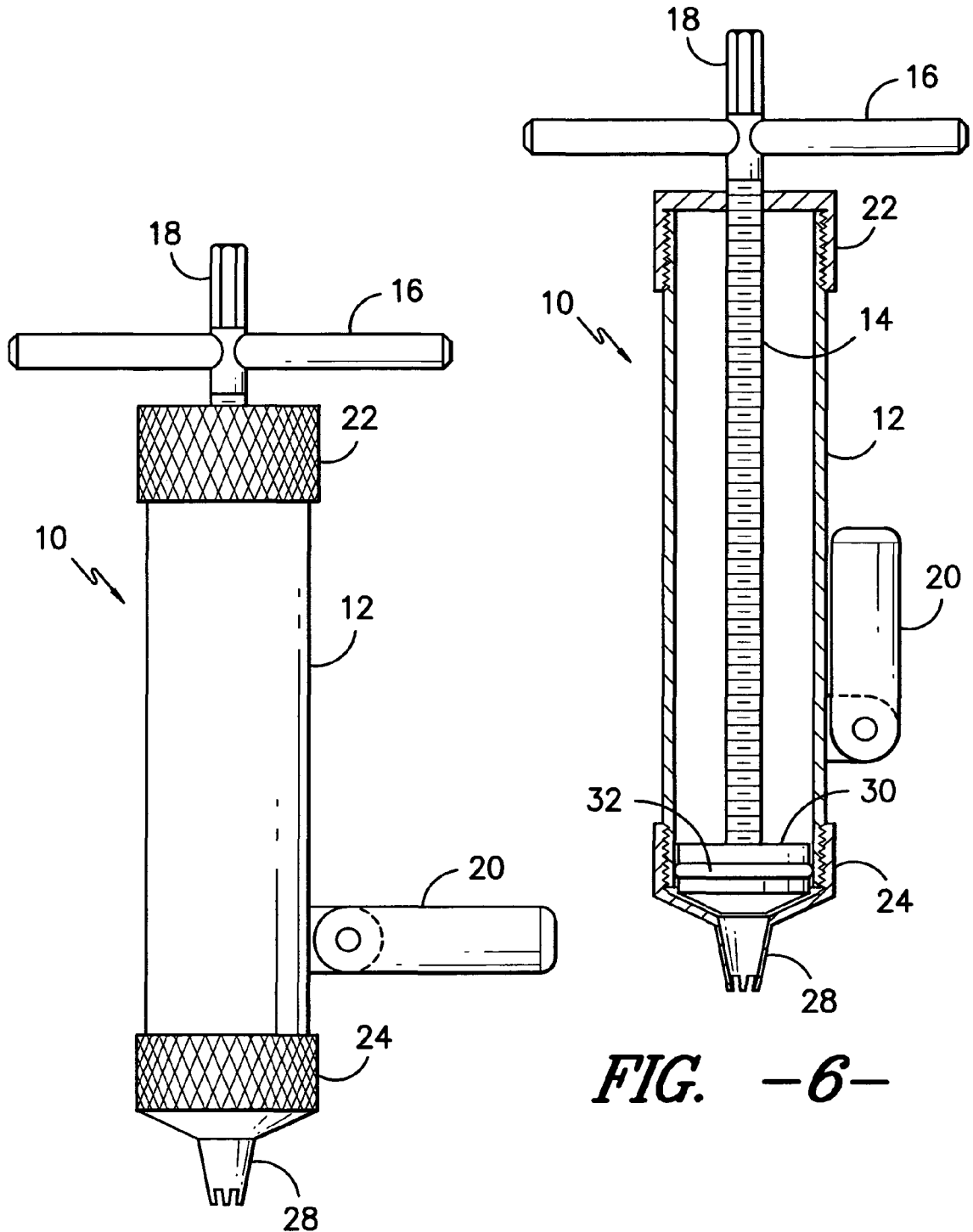
FIG. -5-
FIG. -6-

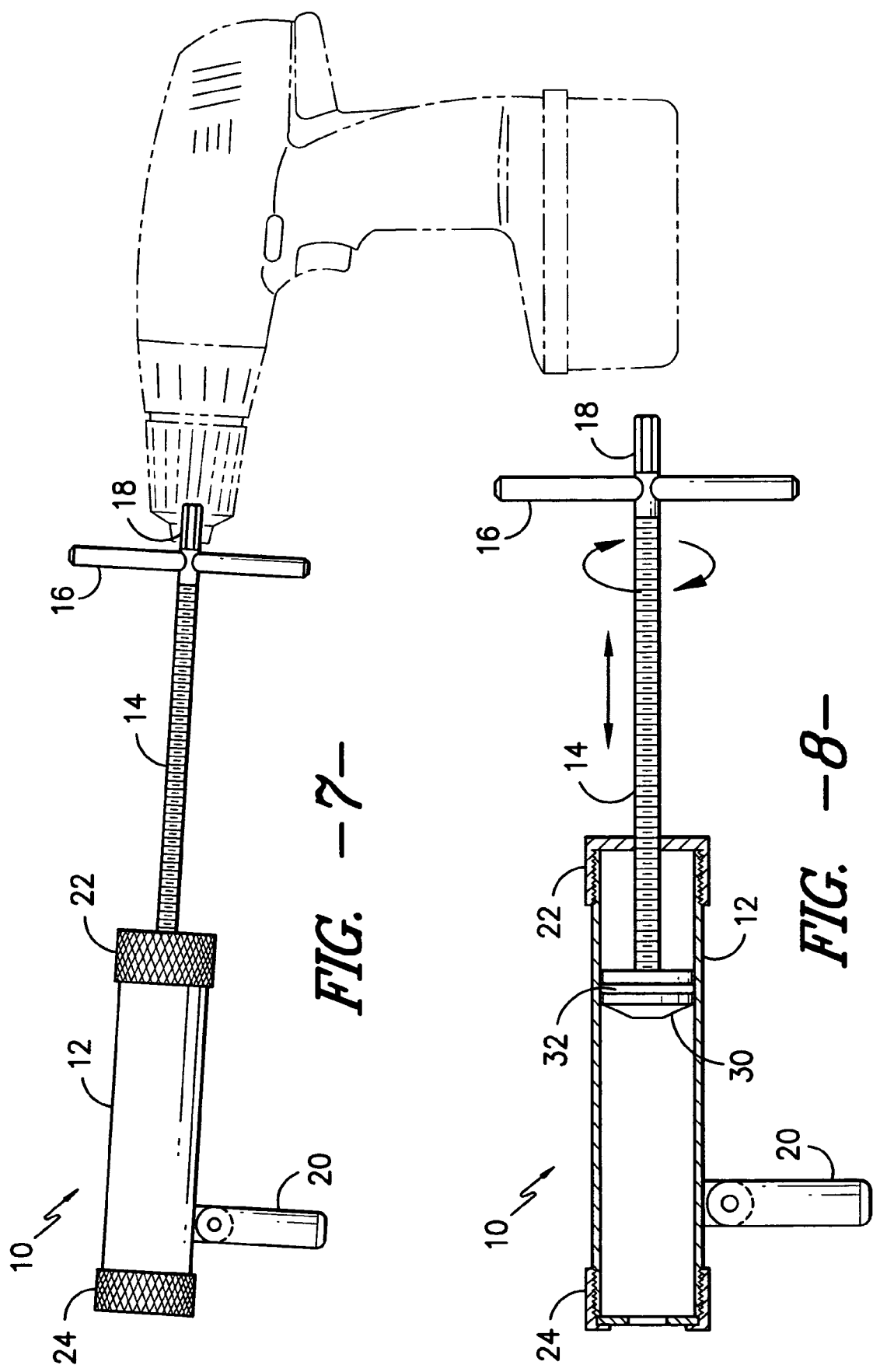

FOOD EXTRUDER

BACKGROUND OF THE INVENTION

1. Field of the Invention

The present invention relates generally to extruding devices used in conjunction with food substances. More specifically, the present invention is a food extruder including a barrel, where the food substance is placed, and a rotating screw with a head inside the barrel that drives the food substance through the barrel to an outlet. The rotating screw may be turned manually, or may be attached to and driven by a standard hand held drill.

2. Description of the Prior Art

Heretofore, efforts have been made to develop food extruders for various types of food substances. There are many types of extruders available today, particularly pasta extruders, and most of those devices are either mounted to a table, or are large enough to sit on a table or platform. Additionally, hand-held food extruders are in existence. U.S. Pat. No. 5,933,188 is one such example. This food extruder includes a rotatable screw member within the barrel, and is operated by manually turning the handle to force the food out of the opening at the opposite end. However, manually turning the rotating screw quickly becomes tiresome, and none of the prior art allows a person to choose between manual operation and operation by using any type of hand-held drill. Further, none of the prior art provides the above combination together with a hand grip extending from the barrel to prevent rotation of the entire apparatus while turning the rotating screw.

SUMMARY OF THE INVENTION

In view of the foregoing disadvantages inherent in the known types of food extruding devices, it is an object of the present invention to provide an improved food extruding device that includes the advantages of the prior art while avoiding the disadvantages. The general purpose of the present invention is to provide a handheld food extruder device that may be operated manually or with the assistance of a standard, hand held drill.

The present invention is a food extruder including a barrel provided at one end with an outlet from which the food substance can be extruded, a rotatable screw positioned within the barrel that is capable of being rotated and moved longitudinally within the barrel, a handle member at a top end of the rotatable screw for manual engagement, and a rod member protruding from an upper portion of the handle member for insertion into a drill chuck. The rod member, in a preferred embodiment, has a hexagonal cross section, which facilitates insertion and securement within a drill chuck, so that the drill may be used to turn the rotatable screw, rather than having to turn it manually. Additionally, a hand grip member may be attached to the barrel member at a generally right angle thereto, so that a user may grip the hand grip while using the drill to turn the rotatable screw, in order to prevent the entire extruder from rotating.

BRIEF DESCRIPTION OF THE DRAWINGS

These and other features, aspects, and advantages of the present invention will become better understood with regard to the following description, appended claims, and accompanying drawings where:

FIG. 1 is a side view of one embodiment of the food extruder, showing the barrel, the handle attached to the rotating screw, the rod member adapted to be secured within a hand drill, caps on either end of the barrel, and a hand grip extending in perpendicular relation to the barrel;

FIG. 2 is a cross sectional view of the food extruder set forth in FIG. 1, further illustrating the rotating screw within the barrel, a head attached to a bottom end of the rotating screw, a circular disc positioned at a bottom portion of the barrel held in place by a cap, and the pivoting hand grip disposed in parallel relation with the barrel;

FIG. 3 is a bottom view of the food extruder set forth in FIG. 1, showing a cap member holding a circular disc in place, wherein the circular disc defines an outlet slit through which the food substance passes, and further showing the hand grip disposed in parallel relation with the barrel;

FIG. 4 is a side view of the food extruder, and further showing a hand drill attached to the rod member for automatic rotation of the rotating screw;

FIG. 5 is a side view of the food extruder shown in FIG. 4, showing the nozzle member at an outlet end of the barrel;

FIG. 6 is a cross sectional view of the food extruder set forth in FIG. 4, further illustrating the rotating screw within the barrel, a head attached to a bottom end of the rotating screw, a nozzle positioned at a bottom end of the barrel, and the pivoting hand grip disposed in parallel relation with the barrel;

FIG. 7 is a side view of the food extruder set forth in FIG. 4, wherein a large portion of the rotating screw is shown extending upwardly from the upper cap, and further showing a drill attached to the rod member for automatic rotation of the rotating screw; and FIG. 8 is a cross sectional view of the food extruder set forth in FIG. 4.

DETAILED DESCRIPTION OF THE INVENTION

A first embodiment of the food extruder is shown in FIG. 1. The food extruder 10 includes a barrel 12 provided at a bottom end with an outlet from which the food substance can be extruded, a rotatable screw 14 positioned within the barrel 12 that is capable of being rotated and moved longitudinally within the barrel 12, a handle member 16 at a top end of the rotatable screw 14 to manually turn the rotatable screw 14, and a rod member 18 protruding from an upper portion of the handle member 16 for insertion into a drill chuck. The rod member 18, in a preferred embodiment, has a hexagonal cross section, which facilitates insertion and securement within a drill chuck, so that the drill may be used to turn the rotatable screw 14, rather than having to turn it manually. Additionally, a hand grip member 20 may be attached to the barrel 12 at a generally right angle thereto, so that a user may grip the hand grip 20 while using the drill to turn the rotatable screw 14, in order to prevent the entire extruder 10 from rotating. The hand grip 20 may be in a fixed position, or it may pivot, so that the hand grip may be folded down to a position parallel with the barrel 12 for storage purposes.

Each end of the barrel 12 includes a removable cap member 22, 24. In a preferred embodiment, the cap members 22, 24 fit over the ends of the barrel, and have sides that slide partially over the sides of the barrel. The inner portion of the sides of the cap members 22, 24, in a preferred embodiment, are threaded, and may be screwed onto either end of the barrel 12, which includes corresponding threads to receive the screw cap 22, 24. It should be understood, however, that other means for attaching the caps 22, 24 to the barrel 12 may be utilized, as desired. A first cap member 22 is positioned on the top end of the barrel, and defines a centrally located threaded hole, through which the rotatable screw 14 passes. As the rotatable screw 14 is rotated within the cap 22, the rotatable screw 14 passes longitudinally through the cap hole in one direction or the other, depending upon which direction the rotatable screw 14 is being turned. A second cap member 24 is similarly positioned on the opposite end of the barrel 12. The second cap member 24 also defines a centrally located hole, where the food substance passes as it is extruded.

A circular outlet disc 26 may be placed under the cap 24 at the outer end of the barrel 12, and the circular outlet disc 26 defines a hole or series of holes in desired shapes which serve to form the cross-sectional shape of the extruded food substance, as shown in FIGS. 1-4, 7 and 8. For instance, if a circular outlet disc 26 defines a slit, the extruded food substance will take the shape of a ribbon, having a cross sectional shape of the slit. Or if the circular outlet disc 26 defines a round hole, then the extruded food substance will take the shape of a cylinder, similar to a spaghetti noodle. A series of circular outlet discs 26 may each include holes of different shapes, and may be used interchangeably with the extruder to produce extrusions of different cross sectional shapes and sizes.

Alternatively, rather than using circular outlet discs, the outlet end of the barrel may be fitted with a nozzle 28, which may be held in place by the cap 24, as shown in FIGS. 5 and 6. In this case, the tip of the nozzle 28 may have a shape that defines the cross sectional shape of the extruded food substance. Different nozzles 28 with tips defining holes of various shapes may be used interchangeably to produce extrusions of different cross sectional shapes and sizes, similarly to the circular outlet discs.

The rotating screw 14 includes a handle member 16 on a top end, which is positioned above the upper cap 22, and outside of the barrel 12. The rotating screw 14 extends through the cap 22 into the interior of the barrel 12, as shown in FIGS. 2, 6 and 8. At the lower end of the rotating screw 14 is a circular head 30. In a preferred embodiment, the circular head 30 is attached to the lower end of the rotating screw 14 so that the head 30 may turn or spin independently of the rotating screw 14, about the longitudinal axis of the rotating screw 14. The head 30 comes into contact with the food substance within the barrel 12, and is used to push the food substance toward and through the outlet at the opposite end of the barrel 12. In a preferred embodiment, the head 30 includes a sealing member such as an o-ring 32 around the outer perimeter thereof, to form a seal against the inside of the barrel 12. Preferably, the o-ring 32 is made of a flexible material such as rubber, although any suitable material may be used.

In order to use the food extruder 10, one end cap 22 or 24 is removed from the barrel 12, and a paste-like food substance, such as cake icing or fondant (for instance), is placed into the barrel 12. The cap 22 or 24 is then replaced. Then, the extruder 10 is placed into a desired position, and the user may twist the handle member 16 manually to rotate the rotating screw 14 in a clockwise direction, which drives the rotating screw 14 with the head 30 toward the opposite end of the barrel 12, thus forcing the food substance through the outlet at the opposite end of the barrel 12. If a circular outlet disc 26 or nozzle 28 is in place, the extruded food substance assumes the cross sectional shape of the hole in the disc 26 or the nozzle 28. Alternatively, the user may attach a drill to the rod member 18 at the top of the handle member 16. The rod member 18 may be inserted into the chuck of the drill, and the chuck is tightened down to secure the rod member 18 within the chuck. Then, the user may use the drill to rotate the rotating screw 14 rather than turning the handle 16 manually. Optionally, a hand grip 20 may be used to prevent the entire food extruder 10 from rotating with the chuck of the drill.

The components of the food extruder 10 may be made from any suitable material that may be properly cleaned. Such materials include stainless steel, plastics, aluminum, or any other suitable material. For cleaning, the food extruder 10 may be disassembled and placed into a dishwasher, or may be washed manually.

It is contemplated that the food extruder 10 may be particularly useful in applications involving cake and pastry decorating. Icing or fondant may be effectively and efficiently extruded for form flowers, borders, and various other decorative elements.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A hand held food extruder comprising:
   a barrel member;
   a first cap removably secured to an upper of said barrel;
   a second cap removably secured to a lower end of said barrel, said second cap defining a hole therein;
   a threaded rotating screw extending through a threaded hole defined in said first cap, said threaded rotating screw including a handle member on an upper portion thereof and positioned outside said barrel member, and a circular head positioned on an opposed end of said threaded rotating screw, wherein said head is disposed within said barrel member; and
   a rod positioned above said handle member, said rod being disposed along the longitudinal axis of said threaded rotating screw and including a hexagonally shaped cross section being adapted to be received and secured within a chuck of a hand held drill.

2. The food extruder set forth in claim 1, further comprising a circular outlet disc positioned underneath said second cap; said circular outlet disc defining a hole of any desired shape and size that defines the cross sectional shape and size of a food substance extruded from an inner portion of said barrel.

3. The food extruder as set forth in claim 1, further including multiple circular outlet discs, each defining a hole of a different size or shape, which may be interchangeably and removably secured underneath said second cap.

4. The food extruder as set forth in claim 1, further including a nozzle that is positioned at a lower end of said barrel and removably held in place by said second cap.

5. The food extruder as set forth in claim 4, further including multiple nozzles, each defining a hole of a different size or shape, which may be interchangeably and removably held in place by said second cap.

6. The food extruder as set forth in claim 1, further including a hand grip member attached to said barrel.

7. The food extruder as set forth in claim 6, wherein said hand grip is pivotally attached to said barrel, so that said handle member may pivot between a perpendicular position and a parallel position with respect to said barrel.

8. The food extruder as set forth in claim 1, wherein said head includes a sealing member around a circular periphery thereof for sealing said head against inner walls of said barrel.

9. The food extruder as set forth in claim 8, wherein said sealing member is an o-ring.

10. The food extruder as set forth in claim 1, wherein said first cap and said second cap include a threaded portion on an inside portion thereof, and correspond with threaded portions on each end of said barrel.

* * * * *